United States Patent [19]

Fonseca

[11] 4,272,372
[45] Jun. 9, 1981

[54] GLOBAL AQUARIUM WITH AERATOR AND PURIFIER

[76] Inventor: Oscar Fonseca, 3054½ San Bruno Ave., San Francisco, Calif. 94134

[21] Appl. No.: 138,309

[22] Filed: Apr. 8, 1980

[51] Int. Cl.³ .............................................. E04H 3/20
[52] U.S. Cl. .................................... 210/169; 434/133
[58] Field of Search ...................... 210/169; 119/3, 5; 35/46 R

[56] References Cited

U.S. PATENT DOCUMENTS

| | | | |
|---|---|---|---|
| 2,422,101 | 6/1947 | Johannsen | 35/46 R |
| 3,566,840 | 3/1971 | Williger | 119/5 |
| 3,720,318 | 3/1973 | Cohen | 119/5 |
| 3,770,128 | 11/1973 | Kast | 210/169 |
| 3,795,225 | 3/1974 | Ogui | 119/5 |
| 3,891,555 | 6/1975 | Bennett | 210/169 |
| 3,903,618 | 9/1975 | Ryers | 35/46 R |
| 4,117,805 | 10/1978 | Ward | 119/5 |
| 4,148,730 | 4/1979 | Williger | 119/5 |

Primary Examiner—Theodore A. Granger
Attorney, Agent, or Firm—Alfons Puishes

[57] ABSTRACT

An aquarium for fish and other forms of marine life is constructed in the form of a globe symbolic of the planet earth and equipped with a special device for aerating and purifying the water. The unique shape of the aquarium lends itself readily to purification and elimination of sedimentary matter and the aerator-purifier is constructed to aerate the water and at the same time is equipped with filters to filter the water and to remove larger foreign matter, the filters being readily accessible and adapted for easy removal, cleaning and replacement.

4 Claims, 3 Drawing Figures

GLOBAL AQUARIUM WITH AERATOR AND PURIFIER

BACKGROUND OF THE INVENTION

The necessity for the aeration of aquarium water in order to sustain marine life as well as the removal of impurities and waste products, and undesirable accumulation of solid matter is a problem which has existed for some time. Attempts have been made to solve this problem by circulating the water through suitable filters, usually external to the aquarium, and then subsequently cleaning or replacing the filter media used. Aeration or the supply of sufficient oxygen has been treated as a separate problem and various methods have been devised for producing this in an aquarium. The prior patent art as known to the applicant at this time is summarized briefly below.

Eheim, U.S. Pat. No. 3,489,095 discloses an electric pump and motor in combination with a fish tank and filter which represents the old method of solving this problem.

Willinger, U.S. Pat. No. 3,512,646 is another pump and filter combination and in this case magnetically coupled for circulating aquarium water through an external filter.

Zelanko, U.S. Pat. No. 3,643,801 teaches a novel disposable filter element positioned in a separate compartment for easy replacement.

Cohen, et al, U.S. Pat. No. 3,994,811 teaches an air operated device which skims and filters water by-passed from the aquarium and then returns the clean water to the aquarium.

Sherman, U.S. Pat. No. 4,093,547 discloses a pump positioned or nested against an aquarium tank which circulates water by means of a magnetically coupled pump and returns it to the filter.

Gorsky, U.S. Pat. No. 4,163,035 discloses a specifically constructed aeration device located exterior to the aquarium.

The patents of Kast, U.S. Pat. No. 3,770,128 and Bennett, U.S. Pat. No. 3,891,555 probably come closest to applicant's invention in that they teach the use of an air stream to circulate water through a series of filters. They both teach the use of internal filters in series and provide for ready removal and replacement as does applicant. Neither of these, however, teach a circulation system which provides for agitation and removal of solid particles which are known to accumulate and contaminate the bottom of aquariums.

SUMMARY OF THE INVENTION

I have invented an aquarium having a novel configuration in combination with a combined aerator and purifier which not only successfully utilizes the flow of air through the aquarium water to force it to circulate through especially constructed filters but also provides an agitation means which causes sediment which collects on the bottom of such aquariums to be stirred up and also flow upward through the filter media and thus maintain the interior of the aquarium clean and obviate the necessity of physical removal of such sediment which is not accomplished by previous devices.

This I accomplish by inserting my device in the aquarium so that its inlet is close to the bottom where the outlet from the air supply is likewise introduced. This not only causes the water to flow upward through the cylindrical configuration of my device, but also carries with it the collected sediment and causes the two to flow upwards through the filters located at the top of my device. The clean water then returns back to remix with the rest of the aquarium water which obviates the necessity of physical cleaning of the aquarium tank which is necessary in all other cases.

Filters themselves, located at the top of the tank, are constructed to separately remove the fine particles through charcoal filter and the coarse particles through a glass wool or similar medium to which they are propelled, both of which are readily accessible for easy removal, cleaning or disposal from the top of the tank. While my aerator filter is particularly well suited for an aquarium of the spherical configuration which I prefer, since the latter encourages the accumulation of sediment close to the bottom center of the tank it is also effective in other shaped aquariums since the circulation of the water will cause the sediment to flow towards the filtration device.

The global construction is rotatably mounted and adapted for the painting of a global map of the world on its exterior with the ocean areas left exposed for viewing of the marine life inside the tank.

DESCRIPTION OF A PREFERRED EMBODIMENT

Figure 2:
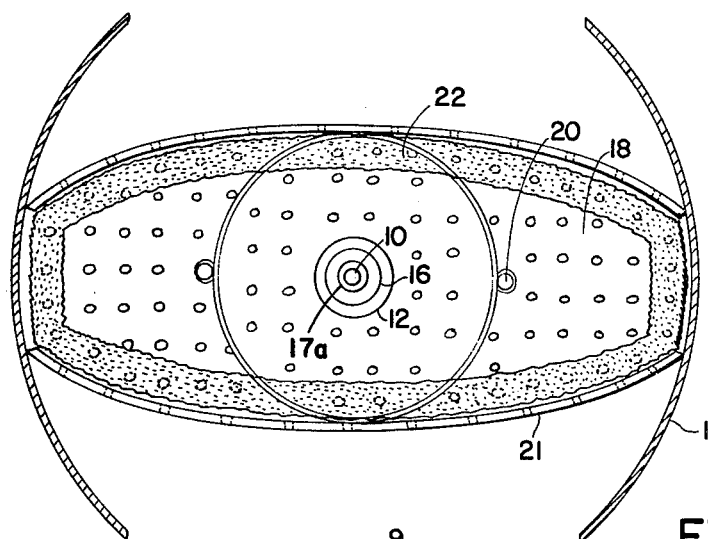
FIG. 2 is a partial top view of the aquarium of FIG. 1 with the cover removed.

Referring now to the figures there is shown first the aquarium tank 1 which is of generally spherical configuration. This is usually constructed of glass or possibly of a transparent plastic material and is suitable for having painted on its exterior a global map of the world with the ocean areas left vacant for observation into the interior. The spherical configuration also aids in the accumulation of sediment in the center of the bottom and for its easy removal as set forth below. The tank is mounted on base 2 which is of hollow construction as shown and houses a support member 3 which is adapted to permit rotation of the tank 1 around the vertical axis. This is accomplished by means of the rotating adaptor 4. The opening in the top of the tank is covered with removable cover 5. An air compressor 6 is positioned inside the hollow base 2 and is supplied with electric power at 7.

Air line 8 runs from air compressor 6 to detachable connector 9 located at the top of the tank which is disposed for easy connection and dis-connection when removing cover 5 and internal filter elements as described more fully below.

Internal air feed to 10 runs vertically through the tank to connect with the cross fitting 11 which is open on three sides and is positioned close to the bottom of the tank.

The housing for my aerator-purifier 12 which is made of glass or possibly transparent plastic is suitable for the painting of underwater ornamental figures desired and is open at the bottom and supported by legs 13. Support for the air feed tube 10 and cross 11 is provided by lugs 14. Support for my lower filter element is shown at 15 with spacer ribs 15a, the filter cartridge itself being shown at 16.

For this lower filter element I use a filter cartridge 16 which contains a filter medium 17 which may be charcoal or other fine filter medium. A perforated plate 18 which is made of glass or possibly transparent plastic is positioned on top of filter cartridge 16. Perforations 19 in the shell of my housing 12 tend to provide circulation between the interior of the housing and the rest of the tank. The perforated support plate 18 is held in position by pegs 20 which are secured to housing 12.

Also fixedly positioned on housing 12 are upper filter support elements 21 which are of arcuate configuration and have a row of perforations for water circulation as shown. These retain upper filter medium 22 which may be of spun glass, glass wool or similar material. Air bubbles 23 are shown emanating from internal air feed tube 10 and rising upwards inside housing 12 and their function in the operation of my aerator-purifier element is set forth below.

The water level is shown at 24 and it is seen how the water circulation may be effected from the interior of housing 12 as indicated by the arrow through both filter media and back to the tank as more fully described below.

OPERATION

The operation of my aquarium produces the unusual results because of its novel construction as set forth below.

Figure 1:
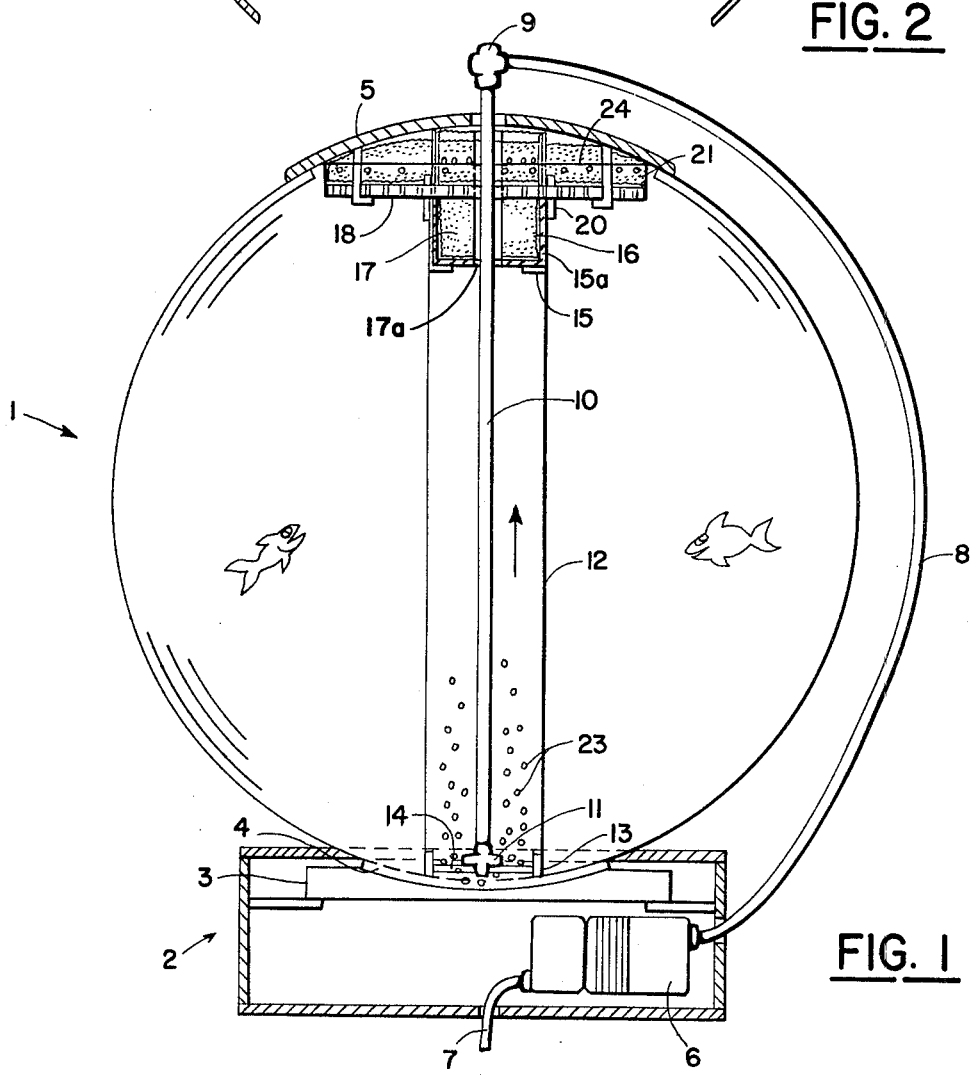
FIG. 1 is a vertical elevation of the aquarium of my invention with the support base shown in section.
Figure 3:
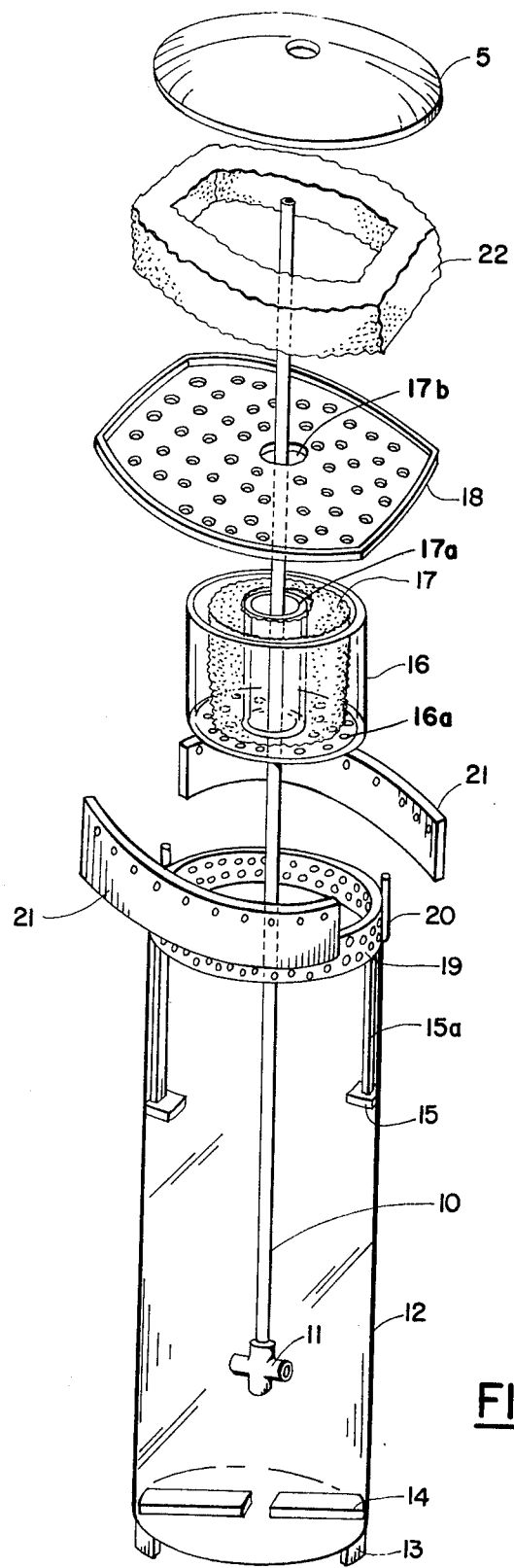
FIG. 3 is an exploded view showing in greater detail the components of my aerator-purifier combination.

The air entering my aquarium through internal air feed tube 10 produces bubbles of air 23 as shown on FIG. 1. These result not only from the air exiting through the horizontal openings in cross 11 but also the air exiting through the bottom opening which as shown creates bubbles impinging upon the bottom of the aquarium tank. The latter have the effect of agitating any collection of sediment which has accumulated in the bottom of the tank and causing it to rise with the water flow effected by the bubbles in the direction indicated by the arrow. This creates a suspension of particles in the water and causes them to flow upward towards the filters.

Filter cartridge 17 as set forth above is a fine filter containing a medium such as charcoal which removes the finer particles in the water as it passes through. The coarser particles are rejected and as the bubbles impinge upon the filter surface they travel around and up through the hole 17a. This bubble action phenomenon causes the coarse particles to travel upward through the holes in perforated plate 18 and into the chamber containing the upper filter medium 22. The water circulation is sent outward through this medium and back down into the aquarium tank, the foreign matter being removed by the filter 22. After depositing the foreign matter, the air bubbles burst and the air escapes through the hole in the cover 5.

The upper chamber formed by plate 18 and elements 21 may be utilized to introduce various kinds of food including live food and chemicals into the aquarium.

Operation may be better understood from the following description. Pressure builds up under cartridge 16 and because of tight fit of cartridge 16 in housing 12 this pressure causes accumulation of bubbles under 16. Because of this, pressurized water is forced up through the perforated holes 16a at the base of 16 and air and water go up through filter medium 17 and escape through the upper holes 19.

Agitation caused by these bubbles around the vicinity of opening 17a in filter medium 17 causes the coarser particles to go up through the center hole 17a in cartridge 16 and filter medium 17 and through hole 17b in plate 18 to the filter medium 22 being deposited thereon and air escaping through perforations in elements 21. Plate 18 may be made of plastic or fiber material to be rejected after use along with the filter medium 22.

I have found this combination of air and water flow and filter arrangement to be exceedingly effective and have operated one of my aquariums for prolonged periods without the necessity of having to physically remove any sediment from the bottom of the tank which is not the case with other purification and infiltration devices.

It is evident from the foregoing disclosure that my filter combination lends itself to ready cleaning and replacement. All that is necessary is to disconnect the air line 8 with the aid of the detachable connector 9 and lift up the cover 5. Filter medium 22 may then be readily removed and replaced. After this, perforated plate 18 may be readily removed thereby providing access to the filter cartridge 16 which in turn may also be readily removed and replaced. After this the lower filter cartridge 16 and the other elements shown may be replaced with clean elements and the device readily reassembled and placed in operation again.

In this manner I not only aerate the water supply and necessary oxygen to sustain the marine life, filter out the fine particles in the water and remove the collected debris from the bottom of the tank thereby insuring a continuing supply of pure, clean and properly aerated water for my aquarium.

I claim:

1. A global aquarium containing a combined aerator-purifier and comprising:
    a water tank of generally spherical configuration;
    a base for said tank;
    a rotatable mounting supporting said tank upon said base;
    a combined aerator-purifier of generally hollow cylindrical configuration positioned vertically in the center of said tank;
    said aerator-purifier having an open bottom in communication with the interior of said tank and in close proximity to the bottom of said tank;
    an air supply tube positioned axially in the center of said aerator-purifier;
    said air supply tube extending towards the bottom of said tank and having an opening in close proximity thereto;
    a source of compressed air supply to said tube;
    a first filter positioned within said aerator-purifier at the top thereof;
    said filter having an outlet communicating with the interior of said tank;
    a second filter positioned above said first filter;
    said second filter communicating with said first filter and the interior of said tank;
    an opening in the top of said tank;
    a removable cover plate having a central hole and disposed to cover said opening;
    said cover plate, said opening and said filters being disposed for easy access, removal for cleaning and replacement of said filters.

2. A combined aerator-purifier for an aquarium comprising:
    a hollow cylindrical body member;

said member being disposed for positioning vertically within a water-filled aquarium;

the open bottom of said member being positioned in close proximity to the bottom of said aquarium;

an air supply tube positioned axially in the center of said cylindrical body member;

said air supply tube extending to the bottom of said cylindrical member;

a fitting in the form of a cross having four openings;

the first of said openings in said fitting being connected to said supply tube;

a second and a third opening in said fitting being at right angles to said tube and being open to the interior of said body member and directed towards the inner surface thereof;

a fourth opening in said fitting being directed downwards in said body member in close proximity to the bottom of said aquarium;

a first filter means positioned at the top of said body member and forming a part thereof;

an air supply to said supply tube through said body member;

a second filter means positioned above said first filter means;

said first filter means comprising a cylindrical filter cartridge so positioned at the top of the interior of said body member as to form a close fit therewith and having a concentric opening therethrough;

said opening communicating fluid flow from the interior of said aquarium to said second filter;

said air supply being disposed to create an upward flow of water in said aquarium through said body member and said first and second filter means;

whereby fine particles are removed by said first filter means and coarse particles are removed by said second filter means.

3. The aerator-purifier of claim 2 in which said filter means comprises the elements:

a cylindrical cartridge positioned within said body member close to the top thereof and providing a narrow space between its outside circumference and the inside circumference of said body member;

a first filter medium positioned within said cartridge;

a perforated horizontal plate positioned on top of said cartridge;

a pair of perforated retaining members of arcuate configuration fixedly positioned upon said body member extending above said perforated plate to form an opening in a chamber thereupon;

a second filter medium of generally oval configuration positioned within said chamber and extending above the walls thereof;

a plate positioned above said second filter medium and disposed to hold the elements of said filter means in position.

4. The aerator-purifier of claim 3 in which said first filter means comprises charcoal and said second filter means comprises glass wool.

* * * * *